United States Patent
Vidal et al.

(10) Patent No.: US 8,713,558 B2
(45) Date of Patent: Apr. 29, 2014

(54) GENERATING PACKAGE PROFILES IN SOFTWARE PACKAGE REPOSITORIES USING SELECTIVE SUBSETS OF PACKAGES

(75) Inventors: Seth Kelby Vidal, Raleigh, NC (US); James Antill, Bristol, CT (US)

(73) Assignee: Red Hat, Inc., Raleigh, NC (US)

( * ) Notice: Subject to any disclaimer, the term of this patent is extended or adjusted under 35 U.S.C. 154(b) by 313 days.

(21) Appl. No.: 12/873,557

(22) Filed: Sep. 1, 2010

(65) Prior Publication Data

US 2012/0054733 A1 Mar. 1, 2012

(51) Int. Cl.
*G06F 9/44* (2006.01)

(52) U.S. Cl.
USPC .......................................... 717/171

(58) Field of Classification Search
CPC ....................................... G06F 8/65
USPC .................................. 717/168, 171
See application file for complete search history.

(56) References Cited

U.S. PATENT DOCUMENTS

| | | | |
|---|---|---|---|
| 6,438,749 B1 | 8/2002 | Chamberlain | |
| 7,240,336 B1 | 7/2007 | Baker | |
| 7,512,939 B2 | 3/2009 | Brookner | |
| 7,624,393 B2 | 11/2009 | Egan et al. | |
| 7,657,885 B2 | 2/2010 | Anderson | |
| 7,836,341 B1 | 11/2010 | Krishnan | |
| 2002/0133814 A1* | 9/2002 | Bourke-Dunphy et al. | 717/174 |
| 2003/0051235 A1 | 3/2003 | Simpson | |
| 2003/0229890 A1 | 12/2003 | Lau et al. | |
| 2004/0054764 A1* | 3/2004 | Aderton et al. | 709/223 |
| 2005/0210459 A1 | 9/2005 | Henderson et al. | |
| 2006/0190773 A1 | 8/2006 | Rao et al. | |
| 2006/0230398 A1 | 10/2006 | Yokota | |
| 2007/0038991 A1 | 2/2007 | Schuft et al. | |
| 2007/0157192 A1 | 7/2007 | Hoefler et al. | |
| 2007/0169075 A1 | 7/2007 | Lill et al. | |
| 2007/0240152 A1* | 10/2007 | Li et al. | 717/174 |
| 2008/0134165 A1 | 6/2008 | Anderson et al. | |
| 2008/0141240 A1 | 6/2008 | Uthe | |
| 2008/0201705 A1 | 8/2008 | Wookey | |
| 2009/0013319 A1 | 1/2009 | Williams et al. | |
| 2009/0037897 A1 | 2/2009 | Dull et al. | |
| 2009/0300595 A1 | 12/2009 | Moran et al. | |

(Continued)

OTHER PUBLICATIONS

"OS X: Updating OS X and Mac App Store apps"; Nov. 30, 2012; Apple® Support webpage; discussing features of Mac OS® X v10.6, release date Aug. 28, 2009.*

(Continued)

*Primary Examiner* — Anna Deng
*Assistant Examiner* — Clint Thatcher
(74) *Attorney, Agent, or Firm* — Lowenstein Sandler LLP (57) ABSTRACT

Embodiments relate to systems and methods for generating package profiles in software package repositories using selective subsets of packages. A physical or virtual client machine can host a set of installed software packages, including operating system, application, and/or other software. A package manager tracks the set of installed packages and reports the inventory of those packages to one or more package servers. The package server(s) can build an aggregate package population record reflecting all packages installed on all machines in the managed network. The package server(s) can then generate arbitrarily selected package subsets from the aggregate package collection, and group or configure sets of machines based on common or compatible package subsets. Machine groups dedicated to different tasks or applications as reflected in their package subsets can then have updating, security, and/or other management tasks carried out on a collective basis.

20 Claims, 7 Drawing Sheets

(56) References Cited

U.S. PATENT DOCUMENTS

| | | |
|---|---|---|
| 2010/0023933 A1 | 1/2010 | Bryant et al. |
| 2010/0058308 A1 | 3/2010 | Demshur et al. |
| 2010/0058314 A1 | 3/2010 | Wang |
| 2010/0083243 A1 | 4/2010 | Mincarelli et al. |
| 2011/0131564 A1* | 6/2011 | Vidal et al. ............ 717/174 |

OTHER PUBLICATIONS

"Apple to Ship Mac OS X Snow Leopard on Aug. 28, 2009"; Apple Press Release; Apple webpage; Aug. 24, 2009.*

"Hash Function"; Wikipedia.org website; Aug. 30, 2009.*

Seth Kelby Vidal, "Systems and Methods for Initiating Software Repairs in Conjuction With Software Package Updates", U.S. Appl. No. 12/714,200, filed Feb. 26, 2010.

Seth Kelby Vidal, "Systems and Methods for Diagnostic Notification Via Package Update Manager", U.S. Appl. No. 12/714,258, filed Feb. 26, 2010.

Seth Kelby Vidal, "Systems and Methods for Managing Software Package Updates Using Communication Pipes", U.S. Appl. No. 12/714,208, filed Feb. 26, 2010.

Seth Kelby Vidal, "Systems and Methos for Generating and Storing Translation Information as Package Metadata", U.S. Appl. No. 12/714,171, filed Feb. 26, 2010.

Seth Kelby Vidal, "Systems and Methods for Generating Predictive Diagnostics Via Package Update Manager", U.S. Appl. No. 12/714,222, filed Feb. 26, 2010.

James Antill, "Systems and Methods for Defining and Enforcing Access Policy for Package Update Processes", U.S. Appl. No. 12/873,850, filed Sep. 1, 2010.

Seth Kelby Vidal, "Systems and Methods for Generating Cached Representations of Encoded Package Profile", U.S. Appl. No. 12/788,139, filed May 26, 2010.

Seth Kelby Vidal, "Systems and Methods for Generating Cached Representations of Host Package Inventories in Remote Package Repositories", U.S. Appl. No. 12/790,699, filed May 28, 2010.

Seth Kelby Vidal, "Systems and Methods for Managing Versions of Software Packages", U.S. Appl. No. 13/037,363, filed Mar. 1, 2011.

Seth Kelby Vidal, "Systems and Methods for Generating an Encoded Package Profile Based on Executing Host Processes", U.S. Appl. No. 12/787,104, filed May 26, 2010.

Seth Kelby Vidal, "Systems and Methods for Restoring Machine State History Related to Detected Faults in Package Update Process", U.S. Appl. No. 12/788,036, filed May 26, 2010.

Seth Kelby Vidal, "Systems and Methods for Generating Client Qualification to Execute Package Update Manager", U.S. Appl. No. 12/788,458, filed May 27, 2010.

Seth Kelby Vidal, "Systems and Methods for Determining When to Update a Package Manager Software", U.S. Appl. No. 12/790,752, filed May 28, 2010.

Seth Kelby Vidal, "Systems and Methods for Generating Exportable Encoded Identifications of Networked Machines Based on Installed Package Profiles", U.S. Appl. No. 12/768,416, filed Apr. 27, 2010.

Seth Kelby Vidal, "Systems and Methods for Tracking Computing Systems Utilizing Software Repositories", U.S. Appl. No. 12/955,671, filed Nov. 29, 2010.

Seth Kelby Vidal, "Systems and Methods for Automatic Upgrade and Downgrade in Package Update Operations", U.S. Appl. No. 12/892,227, filed Sep. 28, 2010.

Seth Kelby Vidal, "Systems and Methods for Detection of Malicious Software Packages", U.S. Appl. No. 12/898,876, filed Oct. 6, 2010.

Seth Kelby Vidal, "Systems and Methods for Space Efficient Software Package Management", U.S. Appl. No. 12/610,006, filed Oct. 30, 2009.

* cited by examiner

| NETWORK ID | AGGREGATE PACKAGE POPULATION RECORD | | ... | |
|---|---|---|---|---|
| 1 | ØA636<br>ØF122<br>ØF180<br>2G6B1<br>2M7C3<br>3HØ3O<br>3N232<br>4C644<br>4F366<br>54767<br>5V331<br>5T848<br>7G112<br>8D211<br>9D640<br>9D668<br>9E141<br>9E202<br>9T114<br>⋮ | | | |
| 2 | ØB334<br>1D110<br>⋮ | | ... | |

MACHINE PACKAGE ASSOCIATION TABLE

| MACHINE ID | SET OF INSTALLED PACKAGES | SUBSET ID NOS. | UPDATE STATUS | PACKAGE SUBSET VERSION NUMBER(S) | ... | SET OF ASSOCIATION ATTRIBUTES |
|---|---|---|---|---|---|---|
| A0001 | ØF112<br>ØF180<br>2G6B1<br>2M7C3 | 2 | SCHEDULED 10/1/10:<br>SUBSET 2<br>VER. 4.0 | SUBSET 2<br>VER. 3.8 | | |
| A002 | 9D668<br>9E202 | NA | | | | |
| A003 | ØA636<br>ØF180<br>9D640<br>9T114 | 1,2 | SCHEDULED 10/15/10:<br>SUBSET 1<br>VER. 6.6<br>SCHEDULED 11/1/10:<br>SUBSET 2<br>VER. 4.0 | SUBSET 1<br>VER. 6.5<br>SUBSET 2<br>VER. 3.7 | | |
| A004 | 2G6B1<br>3H030<br>3N232<br>5U767<br>5V331 | NA | | | | |
| A005 | ØF180<br>2G6B1<br>3H030<br>3N232<br>4C644<br>5V331<br>5T848<br>8D211 | 2,4 | SCHEDULED 10/1/10:<br>SUBSET 2<br>VER. 4.0<br>SCHEDULED 11/1/10:<br>SUBSET 4<br>VER. 7.2 | SUBSET 2<br>VER. 2.9<br>SUBSET 4<br>VER. 7.0 | | |
| A006 | ØF180<br>3H030<br>5V331<br>8D211<br>9D640<br>9E141 | 1,2,4 | SCHEDULED 10/15/10:<br>SUBSET 1<br>VER. 6.6<br>NOT SCHEDULED SUBSET 2<br>SCHEDULED 11/1/05<br>SUBSET 5<br>VER. 7.2 | SUBSET 1<br>VER. 6.0<br>SUBSET 2<br>VER. 4.0<br>SUBSET 4<br>VER. 7.1 | | |
| ⋮ | ⋮ | ⋮ | ⋮ | ⋮ | ⋮ | ⋮ |
| MACHINE X | 4F366<br>7G112 | SUBSET Z | | | | |

FIG. 3B

| PACKAGE SUBSET ENUMERATION TABLE | | | |
|---|---|---|---|
| SET OF SUBSET ID NOS. 180 | SET OF PACKAGE SUBSETS 178 | SET OF MACHINES HOSTING PACKAGE SUBSET 182 | |
| 1 | ØF180<br>9D640 | A003<br>A006 | ... |
| 2 | 0F180 | A001<br>A003<br>A005<br>A006 | |
| 3 | 3H030<br>5V331<br>8D211 | NA | |
| 4 | ØF180<br>3H030<br>5V331<br>8D211 | A005<br>A006 | ... |
| ⋮ | ⋮ | ⋮ | |
| Y | | | |

GENERATING PACKAGE PROFILES IN SOFTWARE PACKAGE REPOSITORIES USING SELECTIVE SUBSETS OF PACKAGES

FIELD

The present teachings relate to systems and methods for generating package profiles in software package repositories using selective subsets of packages, and more particularly, to platforms and techniques for capturing aggregate package populations in a managed network on the package server side, and generating arbitrary subsets of those groupings for updating, maintenance, or other management operations.

BACKGROUND OF RELATED ART

Users of physical or virtual machines commonly install software packages, including package updates, to physical or virtual machines. The software packages can contain a set of related files chosen to perform a given application or task, such as, for example, a group of software applications, drivers, and/or other resources used to install and use messaging applications. In instances, a software package can contain application software, operating system software, drivers, patches, and/or other software components grouped as a logical set.

Software package update managers exist to help a user initiate and perform software package updates, such as, for example, the "yum" (Yellowdog update manager) package update manager available from Red Hat Inc., and others. In general, available software package managers are configured to interact with the set of installed packages on a client and with one or more software package repositories, to directly connect to those databases and download available package updates. In cases, the package update can be formatted as a single combined file containing the various component files, and can be compressed for easier transmission.

The task of managing a network of physical and possibly virtual machines can be complicated by the need to identify and track the population of the machines under management, and the various software package complements installed on those machines. The machines under management and their package complements may need to be identified and tracked for a variety of purposes, including, for instance, to identify and schedule package updates, activate and deactivate machines assigned to networks including on-premise and cloud networks, to perform maintenance, or other package or network management tasks.

In various networks, for example including those having multiple network administrators, or servers or consoles used for management, the task of maintaining an inventory of machines, the software packages installed on those machines, the files contained in packages, or other resources may become increasingly difficult to coordinate. In cases, network administrators or other users may wish to perform a discovery or inventory process on machines in the managed network. The discovery or inventory results may be used to build an inventory of packages that are installed on all machines of the managed network, on a total or aggregate basis.

An administrator or other user may further wish to group or characterize machines in the managed network based on selected package sets or files contained within those sets. They may wish to group or identify sets of machines hosting defined packages, whether or not machines or groups of machines were initially configured or arranged to be related by their software complement or not. For example, an administrator may wish to identify all machines in a managed network having a set of installed packages containing software resources, such as specified compilers or debuggers, for an application development product or project. The administrator or other user may wish to locate all machines currently hosting that set of packages or application, without having to analyze all machines present on the network.

In cases, the administrator or other user might want to determine the population of all such machines on the managed network, whether or not those machines were initially provisioned or organized together. This might take place in a scenario where developer workstations are added over time to an engineering team, for example.

Moreover, the administrator or other user may wish to discover and characterize machines or groups of machines having different or selectable combinations of package sets, which the user may flexibly or dynamically define. For instance, an administrator or other user may in one regard wish to generate a view or "slice" of the managed network to determine which machines contain a combination of video or audio production software, media player(s), and/or other packages or software and may therefore be functioning as digital media workstations.

The user may also wish, at the same or other time, to determine which machines in the managed network also or instead are currently hosting a defined set of email, chat, voice over IP (Internet protocol), social network, and/or other packages or component software, and which subset of the managed network may therefore be acting as messaging platforms. In cases, some or all machines hosting one package subset of interest may overlap with machines hosting a second package subset within the same managed network, or may represent distinct groupings requiring different or separate updates or other maintenance. In current package management platforms, the administrator or other user may not be provided with tools or capability to create, group and manage machines in the network based on arbitrary and/or freely selectable package subsets, across all machines in the managed network. It may be desirable to provide systems and methods for generating package profiles in software package repositories using selective subsets of packages, in which an administrator or other user can access the entire population of packages installed in a managed network, and select a variety of subsets of packages in the network by which to group, organize, and manage client machines.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for generating package profiles in software package repositories using selective subsets of packages. More particularly, embodiments related to platforms and techniques for taking an overall inventory of the set of packages in a managed network, storing that package population inventory in a centralized location, and generating arbitrary subsets of that overall complement to identify, track, or manage machines which share those package subsets. In aspects, a package manager can track and manage the installation of one or more software packages and/or updates to those packages (which may be referred to together as a "software package update" and/or "package installation") on a client, host, target, physical, virtual, and/or other machine. The local package manager can be configured to access the set of installed packages and/or selectable subsets of those packages, and their related attributes on the client or other machine, and derive or generate an inventory of the packages and/or constituent files present on that associated machine. In embodiments, the inventory of the set of installed packages can comprise a list, tree, and/or other record of the software applications installed on a client machine in the managed network. In aspects, the inventory of the set of installed packages for a client machine can be captured and reported by the local package manager installed on that machine, and/or by other local or remote software, services, or logic.

According to further regards, the package manager and/or other logic can transmit or communicate the inventory of the set of installed packages of a subject client machine to one or more than one remote management platforms. The one or more remote management platforms can be or include one or more package servers and/or one or more repositories associated with the server(s), and/or other platforms or logic. In embodiments, the one or more package servers and/or other logic can receive the respective inventory of the set of installed packages from some or all machines on the managed network. The one or more package servers and/or other logic can capture and store the package inventories from all machines reporting those inventories, and build an aggregate package population record that lists or records all packages on all machines present in the managed network. That aggregate package population record can store and record the hosted packages by various content, identifiers or attributes, including names or other package IDs, version numbers, file contents of the packages, and/or other data related to the total package complement installed across the entire managed network. In aspects, the one or more package servers and/or other platforms or logic can sort, search, extract, and/or otherwise select any one or more arbitrary subsets of packages found in the aggregate package population record. For instance, an administrator or other user may wish to identify and group machines hosting a certain email package in one grouping, and machines hosting various browser types or versions into different groups or series of groups. In aspects, the package server(s) and/or other remote platforms that develop the selected package subsets can then carry out provisioning, security, maintenance, and/or other management operations on the subsets of client machines in the managed network defined by their subset complement, on a differentiated basis.

For instance, the inventory of the set of installed packages for each machine on the managed network can be transmitted to, stored in, or accessed by a remote package server and/or software package repository, to build the aggregate package population record and permit software package updates and other operations to be performed on various defined package subsets of those machines. In aspects, the aggregate package population record and/or package subsets packages can in addition or instead be transmitted to or accessed by a network management platform, not necessarily dedicated to package operations, to identify the subject machine(s) or groups of machines related by installed package subsets for network maintenance, security, and/or other management operations.

In aspects, after the aggregate package population record and selected package subsets have been initially generated, newly connected machines in a managed network can be automatically discovered or identified, and have their package inventories automatically captured, reported, and added to the total complement. According to aspects, the one or more package servers and/or other logic can automatically assign newly discovered machines to one or more existing machines groups, based on the selected package subsets that may be present on those newly attached systems. The resulting machine populations across various groupings and package subsets can thereby be registered and tracked by the package server(s) and/or other platforms or logic based on those groupings and identifications. In aspects, the selected package subsets can likewise be revised and updated at any time, for instance to create new package subsets and/or delete existing subsets that have been previously defined. These and other embodiments described herein address the various noted shortcomings in known package management and network management technology, and provide a user with enhanced package and system management capability including the ability to identify and manage arbitrary package subsets in a managed network or other installation.

Reference will now be made in detail to exemplary embodiments of the present teachings, which are illustrated in the accompanying drawings. Where possible the same reference numbers will be used throughout the drawings to refer to the same or like parts.

Figure 1:
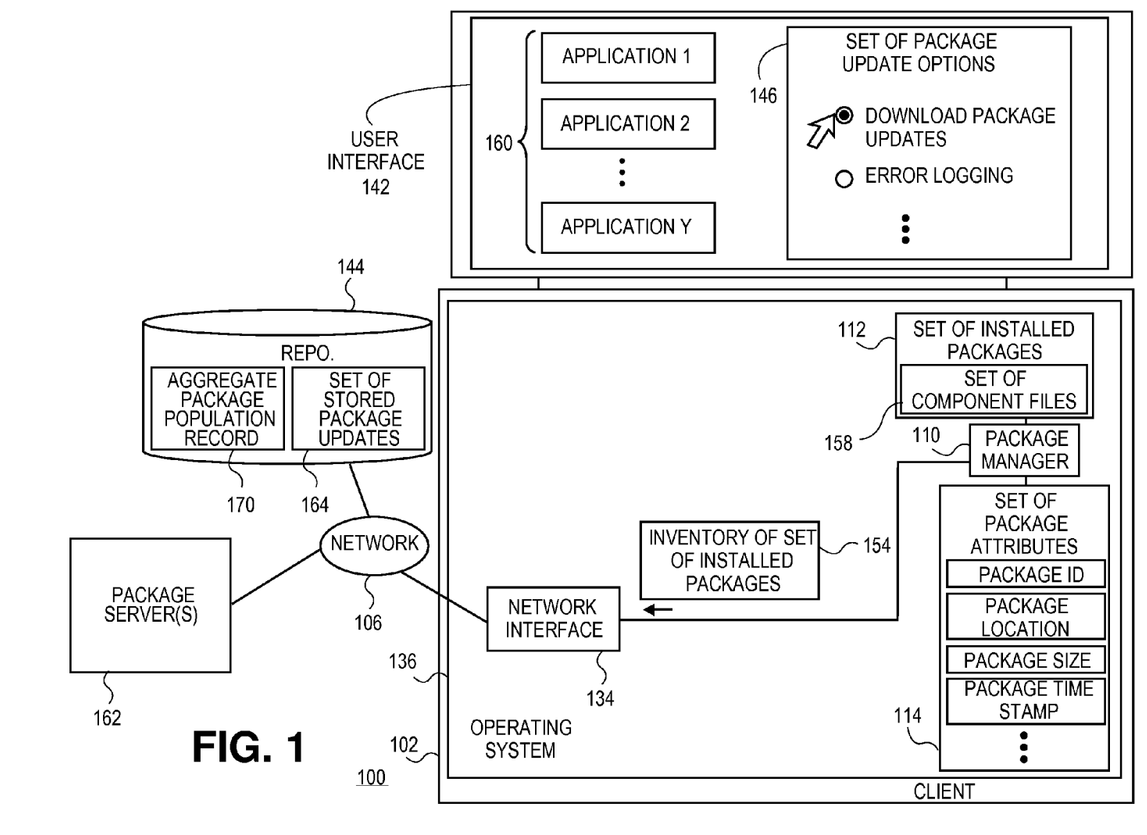
FIG. 1 illustrates an overall network in which systems and methods for generating package profiles in software package repositories using selective subsets of packages can be implemented, according to various embodiments.

FIG. 1 illustrates an exemplary system 100 in which systems and methods for generating package profiles in software package repositories using selective subsets of packages can be implemented, according to various embodiments. In embodiments as shown, a client 102 can store, execute, and otherwise host a variety of resources including a package manager 110 configured to communicate with a set of installed packages 112, and other hardware, software, and resources. In embodiments, the package manager 110 can be or include a software application, a utility, an application programming interface (API) to an operating system 136 of client 102, a service, and/or other local or remote logic or resources. According to embodiments, the package manager 110 can access and manage the set of installed packages 112 to identify, run, edit, update, configure, and otherwise manage one or more software packages locally hosted or installed in the client 102. In aspects, the package manager 110 can be or include one or more commercially and/or publicly available package manager applications or resources, such as the "yum" package update manager available from Red Hat Inc. based on or compatible with the Red Hat package manager (rpm) platform, or others.

In aspects, the set of installed software packages 112 can be or include packages comprising various types of applications, such as, for example, messaging applications, spreadsheet or modeling applications, social networking applications, word processing applications, modeling applications, media applications, and/or other applications, software, or utilities. In aspects, the set of installed software packages 112, can in aspects include an operating system, drivers, and/or components thereof. The set of installed packages 112 can have an associated set of package attributes 114 which records file names, versions, dates, storage size, software or hardware requirements, an/or other attributes or metadata related to the software packages and/or their updates installed on client 102. In aspects, a user may browse set of installed packages 112 in list or other form via selector tool 146 or other interface, to check or otherwise select one or more packages to analyze, manage, and/or identify on client 102.

In aspects, and as also shown, the package manager 110 can communicate with a network interface 134 configured to connect to one or more network 106, such as the public Internet or other public or private networks. The package manager 110 can thereby connect to one or more package servers 162 and/or associated one or more package repositories 144 hosting software packages including software package updates, and/or other software or resources. The one or more package servers 162 can in embodiments include logic to identify, organize, and distribute one or more software packages to requesting client, server, virtual, and/or other machines.

In aspects, the package manager 110 can interact with the set of installed packages 112, one or more package servers 162, and/or the associated one or more package repositories 144 via network interface 134 and one or more networks 106 to identify and manage the content of set of installed packages 112 operating on client 102. The package manager 110 of each client 102 in the managed network can develop and inventory of the set of installed packages 154 of each machine, and report that inventory data to the one or more package servers 162. In aspects, the package manager 110 can, for example, provide a user with a selector tool 146 displayed via user interface 142, such as a graphical user interface or others, to select various test, configuration, inventory, and/or other management activities on the set of installed packages 112. The package manager 142 displays via the user interface 142, for example, applications 160 on the set of installed software packages 112. The selector tool 146 can present options to select packages for installation and/or update, and/or to carry out various other installation options. The selector tool 146 can likewise present options to initiate an inventory of the set of installed packages 112 located on client 102, and/or other selectable options or parameters for managing the package complement of the client 102.

In aspects, in general the package manager 110 can access and extract information related to set of installed packages 112 to generate the inventory of the set of installed packages 154 and transmit that inventory to the one or more package servers 162 and/or associated one or more repositories 144. The inventory of the set of installed packages 154 extracted from each client 102 can contain a list or other record or enumeration of the set of installed packages 112 on the client 102, such as the package name or other package identifier for each package installed, present, and/or hosted on the client 102. In aspects, the inventory of the set of installed packages 154 can be arranged as a list, database, tree, and/or other record or data object. In aspects, the inventory of the set of installed packages 154 can in addition or instead incorporate some or all of the set of package attributes 114 for each package identified in the set of installed packages 112 and/or inventory of the set of installed packages 154.

It may be noted that in embodiments, the package manager 110 can generate the inventory of the set of installed packages 154 and associated data, in an encoded format. In aspects, package manager 110 may for instance generate a string, label, value, address, and/or other identifier which identifies or associates client 102 by or with its hosted set of installed packages 112 and/or one or more selected package subset of the set of installed packages 112. For instance, the package manager 110 can generate the inventory of the set of installed packages 154, or components thereof, as the output of a hash function or hash operation performed on one or more attributes contained in set of package attributes 114 for one or more packages of the client 102. For instance, package manager 110 can perform a hash function, such as Secure Hash Algorithm 1 (SHA1) or other hash function versions and/or other encoding algorithms, on attributes such as the package name, package epoch, package timestamp, package size, a checksum value, a package release identifier, and/or other data. In embodiments, the inventory of the set of installed packages 154 can also be stored or formatted in an unencoded format.

In embodiments, and as also shown in FIG. 1, the one or more package servers 162 receiving the inventory of the set of installed packages 154 from the client 102 can accept that data and use it to build an aggregate package population record 170. In aspects, the aggregate package population record 170 can be stored or recorded in the one or more repositories 144 which may be associated with the one or more package servers 162, and/or can be stored or partially stored in the one or more package servers 162 themselves, such as in local hard disk or electronic memory on the one or more package servers 162. The aggregate package population record 170 can reflect or incorporate the inventory of the set of installed packages 154 received from various clients or other machines, and enumerate or identify all packages present or reported on all machines within a network under management. In aspects, an administrator or other user can then access the aggregate package population record 170 to analyze and manage the package complement and related resources across an entire network or group of machines, for instance to perform updates, and/or other maintenance or management on clients grouped or characterized according to their package profile. In aspects, a set of stored package updates 164 are stored in the one or more repositories 144. The administrator or other user can thereby select, arrange, group, classify, and otherwise manage any arbitrary group, or collections of groups, of clients within the network under management, as related by package commonality or compatibility.

Figure 2:
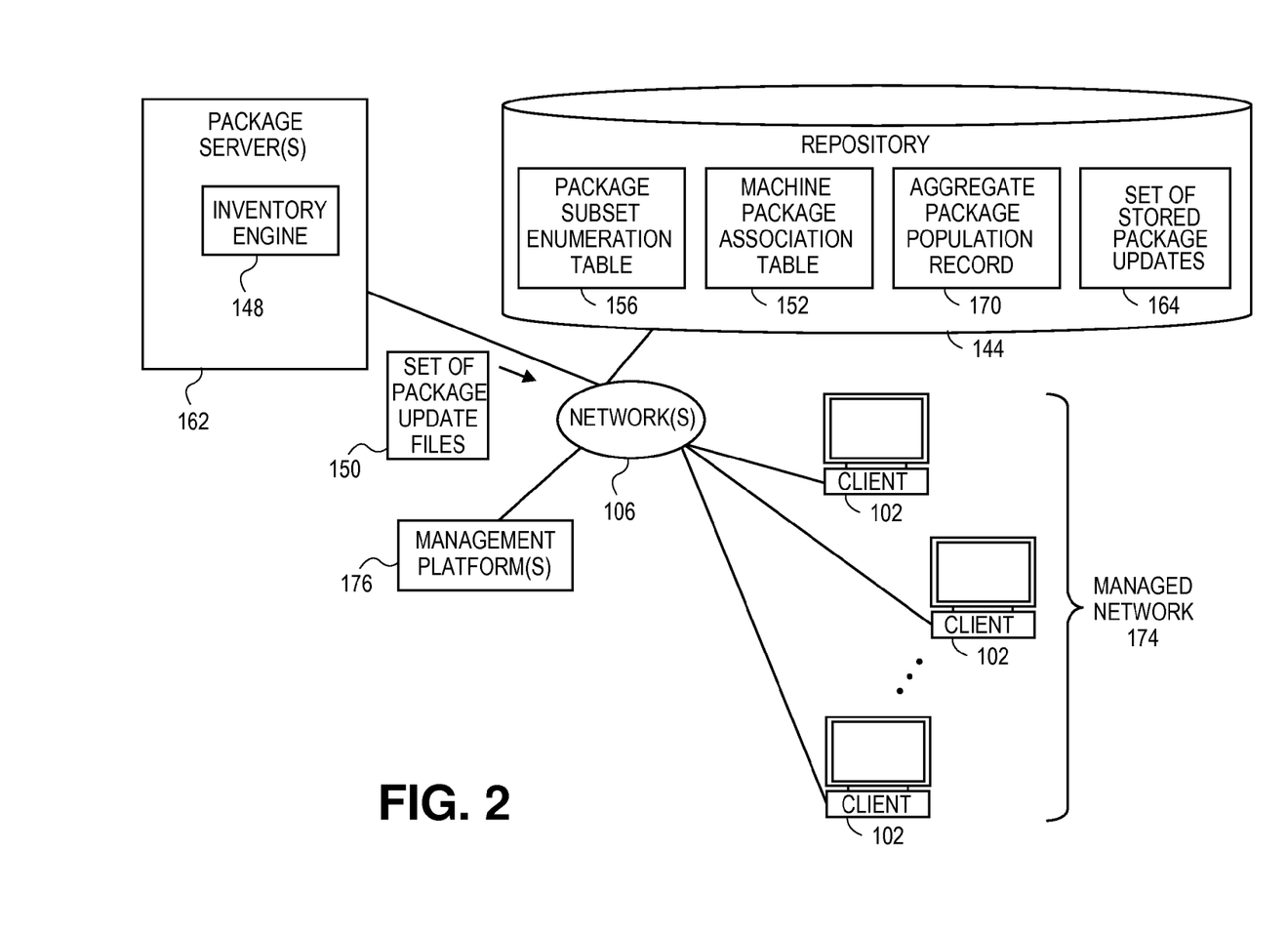
FIG. 2 illustrates an overall network in which systems and methods for generating package profiles in software package repositories using selective subsets of packages can be implemented, according to various embodiments in further regards.

As illustrated for example more particularly in FIG. 2, package manager 110 can connect to one or more remote platforms and communicate the inventory of the set of installed packages 154, to facilitate remote package, network management, and/or other operations or services on one or more clients 102 of managed network 174. In aspects, the managed network 174 can comprise or contain a set of clients 102, and/or other machines, nodes, systems, or platforms. For instance, package manager 110 and/or other logic hosted or installed in each client or other machines can access one or more package servers 162 and/or one or more repository 144 to initiate package management and update operations on client 102, including to receive a set of package update files 150 tailored to the set of installed packages 112 on each client 102.

According to aspects, the one or more package servers 162 can further execute inventory and machine grouping operations on the managed network 174, including to identify and develop a set of package subsets arbitrarily selected or identified from the aggregate package population record 170. In aspects as shown, the one or more package servers 162 can host or execute an inventory engine 148 and/or other logic to collect the aggregate package population record 170 and specify the set of package subsets for use in analyzing, managing, and/or updating sets of clients 102 contained in the managed network 174. In embodiments, the inventory engine 148 and/or other logic can develop records related to the package complement and package groupings populating the managed network 174, including the aggregate package population record 170, a package subset enumeration table 156 which lists or identifies all package subsets selected or identified from the aggregate package population record 170, a machine-package association table 152 which can associate one or more clients 102 located in managed network 174 with one or more package subsets and the set of stored package updates 164. By building groupings of clients 102 that are keyed on package subset commonality, an administrator or other user can discover, locate, group, and manage arbitrary subsets of clients 102 in the managed network 174 based on their package characteristics. The one or more package servers 162 can access the machine-package association table 152, for instance, to generate, access, or identify and set of package update files 150 for each group of clients 102 that contain one or more common subsets identified in the package subset enumeration table 156. The grouping of machines that contain one or more of the package subset enumeration table 156 can be encoded or stored in the machine-package association table 152, to permit machines having common subsets for instance to undergo updating or maintenance on a common basis. Machines hosting a package subset related to email or other messaging can all receive a common update to the hosted email client and/or other package updates, as all or part of the set of package update files 150. All machines hosting a firewall or other security application can for instance receive an updated version to a firewall application or service, as all or part of the set of package update files 150. Other groupings of clients 102 based on selected or identified package subsets can be used. It may be noted that in embodiments, information stored or generated by the one or more package servers 162 and/or associated logic can also be transmitted to one or more remote management platforms 176, such as security, storage, and/or other management platforms or services. The one or more remote management platforms 176 can therefore also or instead carry out operations on the grouped clients 102 of the managed network 174, on a common or centralized basis.

Figure 3A:
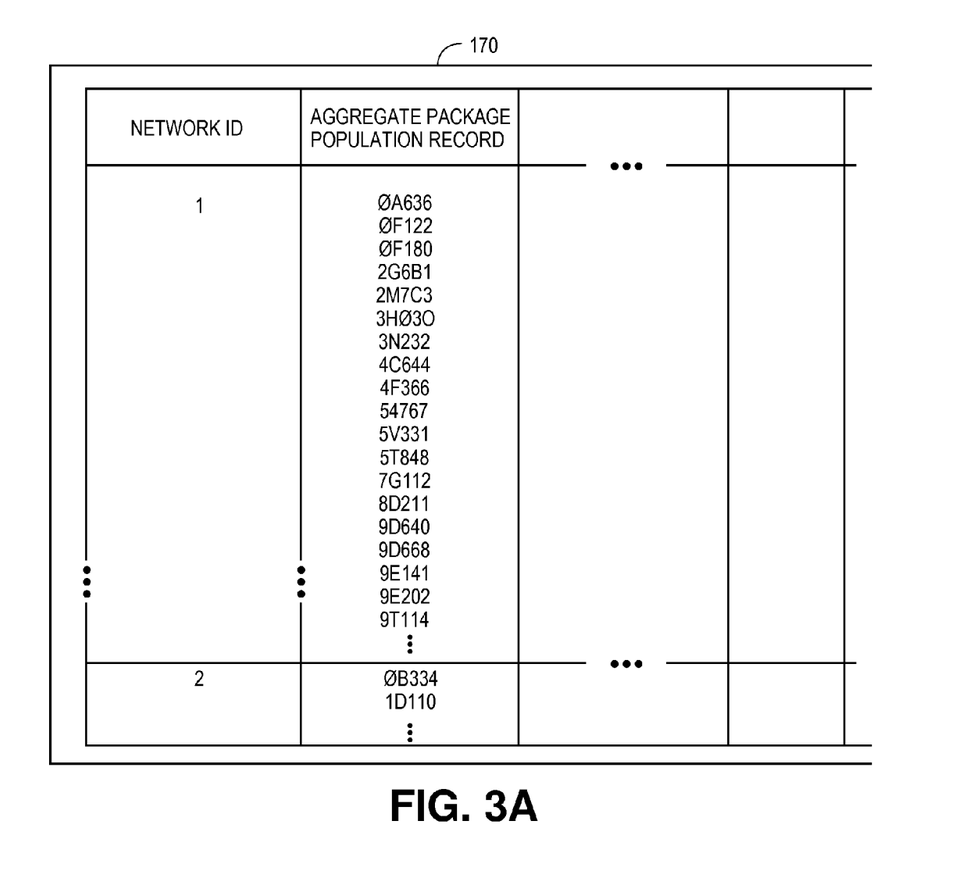
FIGS. 3A-3C illustrate exemplary data structures, encodings, and other features that can be used to store and process data in conjunction with systems and methods for generating package profiles in software package repositories using selective subsets of packages, according to various embodiments.

FIG. 3A illustrates an exemplary data structure for the aggregate package population record 170 that can be used in implementations of systems and methods for generating package profiles in software package repositories using selective subsets of packages, according to various aspects of the present teachings. In aspects as shown, a managed network 174 can be identified by a network ID, and have associated with it a listing or other enumeration or identification of all packages hosted on all machines in that managed network 174, on an inclusive basis. In aspects, packages stored in the aggregate package population record 170 can be identified by their package name, but can in addition or instead also be identified by the set of package attributes 114 for each package, and/or using other attributes or data.

Figure 3B:
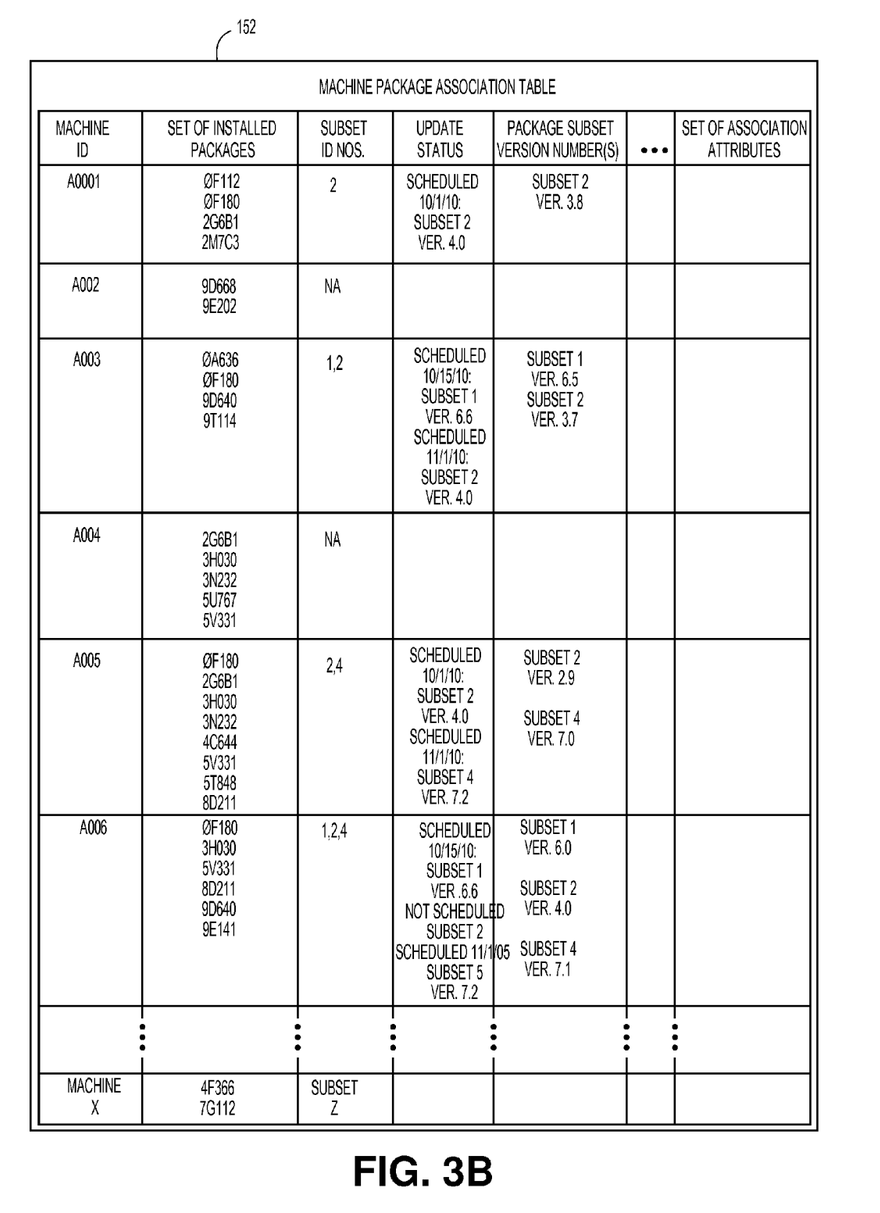
Figure 3C:
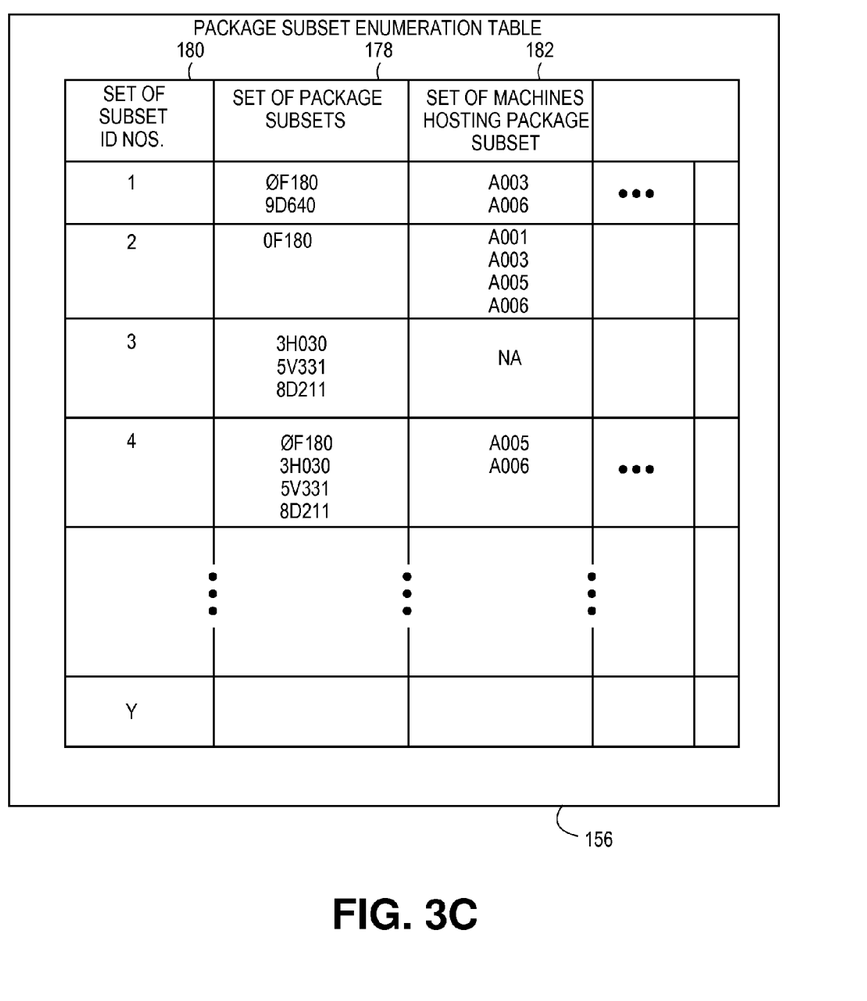

FIG. 3B illustrates an exemplary data structure for the machine-package association table 152 that can be used in implementations of systems and methods for generating package profiles in software package repositories using selective subsets of packages, according to various aspects of the present teachings. In aspects as shown, the machine-package association table 152 can be organized according to a set of association attributes arranged as fields which relate an individual client 102 to the set of package subsets 178 and other information. Each client 102 can for instance be identified by a machine ID, such as a MAC (media access control) address, and Ethernet or other network address, and IP (Internet protocol) address, and/or other identifier. The package subsets to which that client 102 is associated or registered can be recorded by subset ID, for instance as structured or stored in the package subset enumeration table 156 shown in FIG. 3C. As shown in FIG. 3C, each package subset in the set of package subsets 178 can be assigned an ID number in a set of subset ID numbers 180, and in embodiments, each identifier in the set of subset ID numbers 180 can have an associated set of machines hosting the package subset 182.

According to aspects, the inventory engine 148 of the one or more package servers 162 and/or other logic can thereby analyze the package complement of the managed network 174 by performing joins and/or other operations on the aggregate package population record 170, the machine-package association table 152, the package subset enumeration table 156, and/or other data or objects illustrated in FIGS. 3A-3C to discover, manage and maintain desired package subsets and associated machine groupings in the managed network 174. While those records and data are illustrated in those figures, it will be understood that other tables, databases, trees, and/or other data structures or objects can be used to encode and store data related to the overall package complement of the managed network 174.

Figure 4:
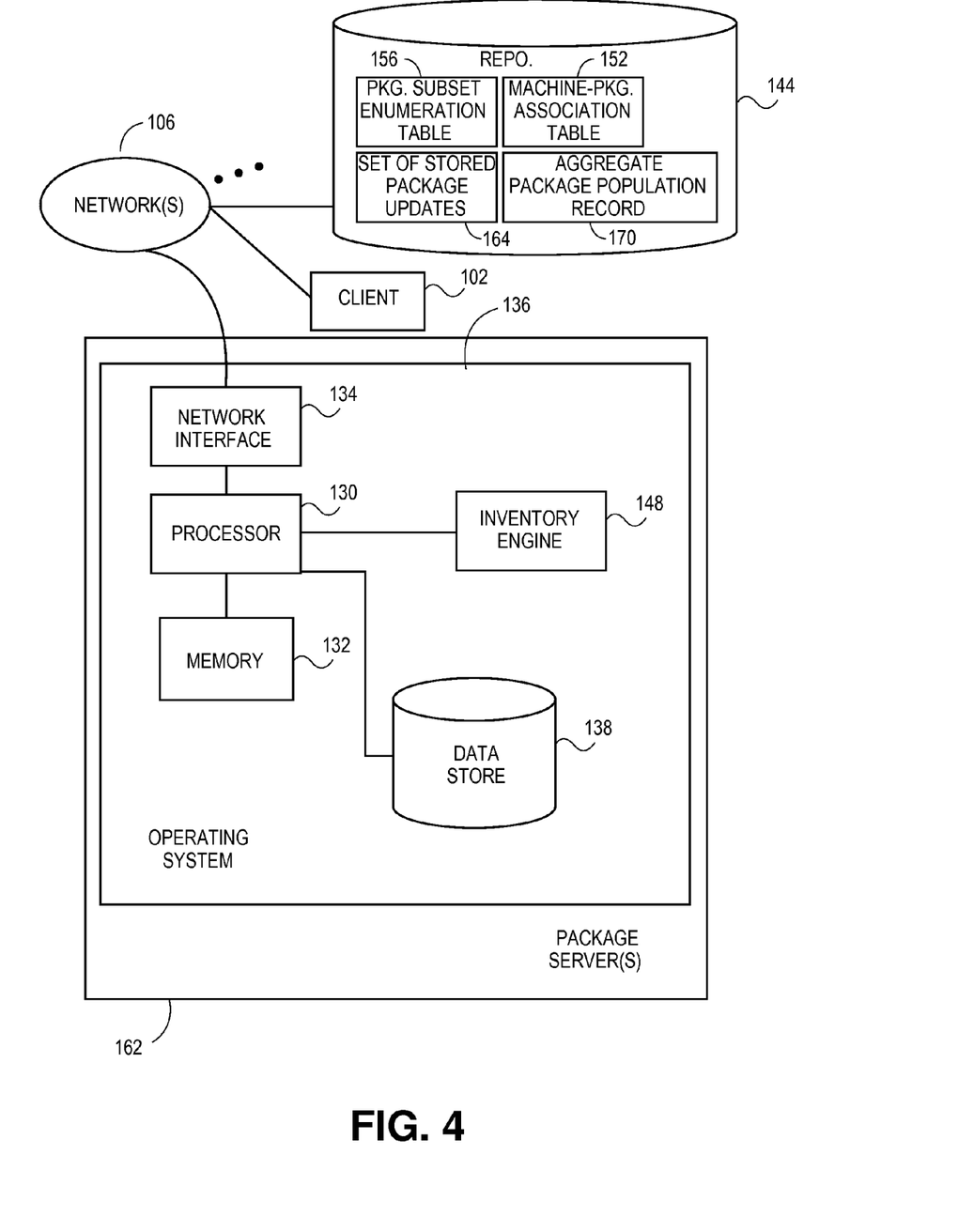
FIG. 4 illustrates a diagram of exemplary hardware and other resources that can be used in the implementation of a package server and other platforms of systems and methods for generating package profiles in software package repositories using selective subsets of packages, according to various embodiments.

FIG. 4 illustrates an exemplary diagram of hardware and other resources that can be incorporated in a server of one or more package servers 162 configured to install, host, manage, and analyze the aggregate package population record 170, the package subset enumeration table 156, the set of stored package updates 164 and other data or resources, according to embodiments. In embodiments as shown, a server of one or more package servers 162 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with data store 138, such as a database stored on a local hard drive. Processor 130 further can communicate with a network interface 134, such as an Ethernet or wireless data connection, which in turn communicates with one or more networks 106, such as the Internet or other public or private networks. Processor 130 also communicates with each client 102 of the managed network 174, package manager 110, and/or other resources to execute control logic and control the inventorying, subset selection, updating, installation, analysis and management of software packages and their associated processes. Other configurations of servers in one or more package servers 162 client 102, including processor and memory resources, associated network connections, and other hardware and software resources are possible. It may be noted that in embodiments, the client 102 and/or other machines or platforms in the managed network 174 can comprise or contain similar hardware, software, and other resources as the illustrated server platform of the one or more package servers 162, or can host or comprise different hardware and software configurations.

Figure 5:
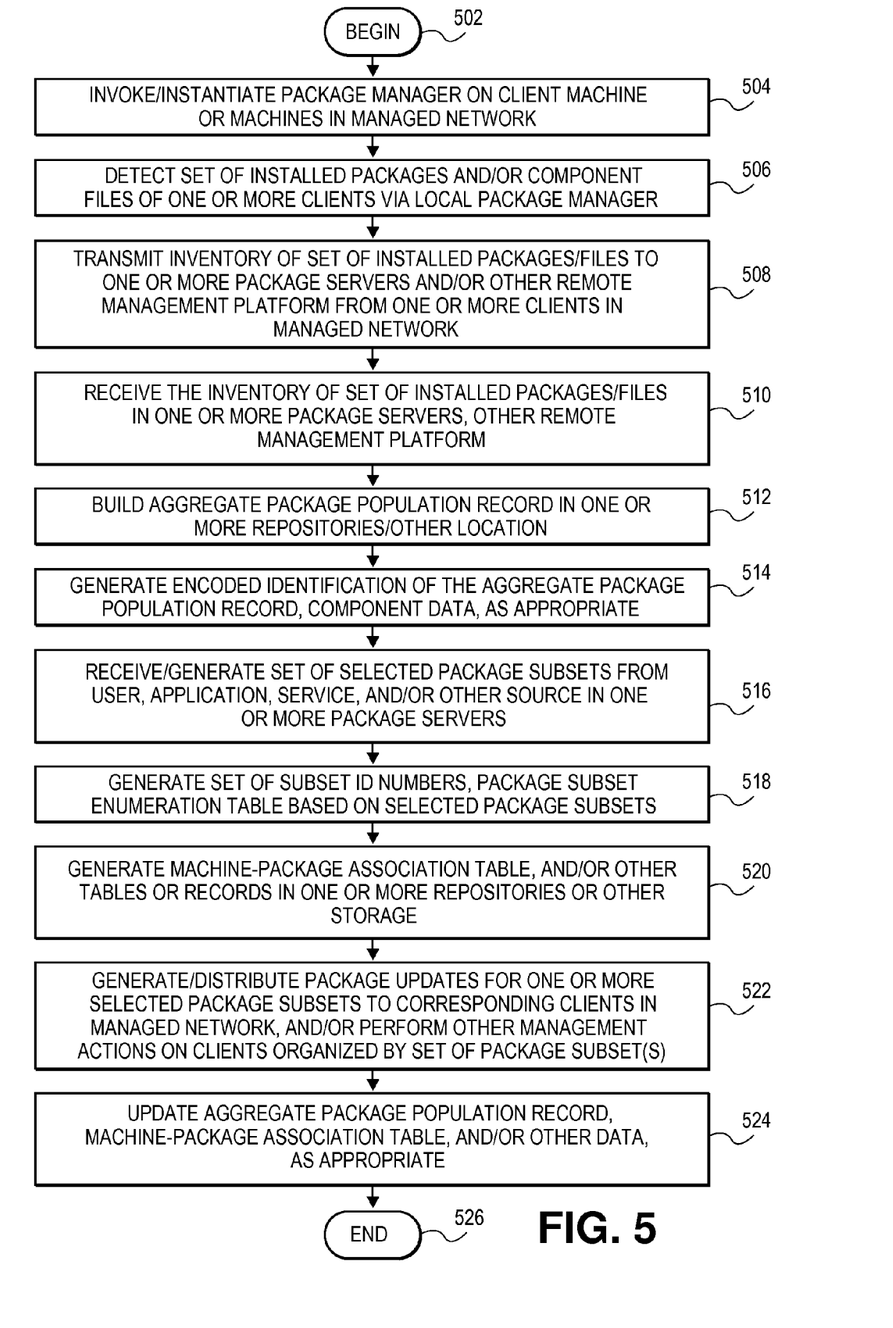
FIG. 5 illustrates a flowchart of package inventory and subset processing that can be used in systems and methods for generating package profiles in software package repositories using selective subsets of packages, according to various embodiments.

FIG. 5 illustrates overall processing to capture software package information from machines, and generate package inventories, package subsets, and other reports or analyses, according to various embodiments. In 502, processing can begin. In 504, a user can invoke or instantiate package manager 110 on client 102 to perform software package discovery and inventorying, machine identification, and other inspection or management activity. In 506, the set of installed packages 112, the set of component files 158, the set of package attributes 114, and/or other data related to the package complement of the client 102 or multiple clients 102 can be captured and/or accessed, for instance via package manager 110 and/or other logic. In aspects, the set of installed packages 112 and/or other information can be discovered and recorded for multiple clients at the same time, and/or different clients at different times, based on a network-wide interval or schedule, and/or at other times. In 508, the package manager 110 of each client that has collected package data can transmit the resulting inventory of the set of installed packages 154 to the one or more package servers 162, to the remote management platform 176, and/or other destination. In aspects, the inventory of the set of installed packages 154 can be transmitted in an encrypted or encoded format.

In cases where an encoded representation is used, that representation of the inventory of the set of installed packages 154 and/or related data can be generated using a hash function operating on text, strings, or other data reflecting the set of installed packages 112, one or more attributes in set of attributes 114 for the subject packages, and/or other data. In aspects a hash function or hash operator can be used to generate the encoded representation. When used, the hash function can be or include SHA1 (Secure Hash Algorithm 1), SHA2 (Secure Hash Algorithm 2), SHA3 (Secure Hash Algorithm 3), and/or other hash functions, operators or routines. In embodiments, the inventory of the set of installed packages 154 and/or other data or portions thereof can also or instead can be sent in the clear or in an otherwise unencoded format.

In 510, the inventory of the set of installed packages 154 of the one or more client 102 that has collected package data can be received in the one or more package servers 162, in the remote management platform 176, and/or other platform or destination. In 512, the one or more package servers 162 and/or other logic can build the aggregate package population record 170. In aspects, the aggregate package population record 170 can be generated and/or stored in the one or more repositories 144 associated with the one or more package servers 162, and/or in other storage or locations. In aspects, the aggregate package population record 170 can reflect the entire population of packages contained or hosted in all clients 102 and/or other machines populating the managed network 174. In aspects, the aggregate package population record 170 can be encoded or configured as a table, a relational or other database, a tree, and/or other data structure or format. In aspects, the aggregate package population record 170 can also or instead be stored in a distributed fashion, with components of that data being hosted or recorded in different local or remote databases or other data hosting resources.

In 514, the inventory engine 148 of the one or more package servers 162 and/or other logic can generate an encoded identification of the aggregate package population record 170 or the constituent data of that record, as appropriate. In 516, the inventor engine 148 of the one or more package servers 162 and/or other logic can receive, access, extract, and/or generate the set of package subsets 178, for instance via user input supplied through a selector tool or other interface. In aspects, the set of package subsets 178 can also or instead be supplied or received through an automated source, such as an application, database, and/or service that generates the set of package subsets 178 on a selective basis.

In 518, the inventory engine 148 of the one or more package servers 162 and/or other logic can generate the set of subset ID numbers 180, and the package subset enumeration table 156 based on the set of package subsets 178. In 520, the inventory engine 148 of the one or more package servers 162 and/or other logic can generate the machine-package association table 152, and/or other data, records, or output to encode and store relationships between the clients 102 populating the managed network 174 and set of package subsets 178 that are distributed throughout the managed network.

In aspects, the machine-package association table 152 can relate, group, and/or associate clients 102 and/or other machines according to the individual packages they may share in the set of package subsets 178. In aspects, machines can be grouped or associated based on a single list or set of common package subsets, and/or can be grouped or associated based on multiple subsets in the set of package subsets 178. In aspects, the ability to specify an arbitrary set of package subsets 178 and organize the clients 102 and/or other machines or platforms in the managed network 174 can allow an administrator or other user to usefully link, compare, and/or maintain diverse groups of machine on a centralized basis, and in aspects can permit the user to discover previously unknown relationships between the machines populating the managed network 174. As aspects, the aggregate package population record 170, the set of package subsets 178, and other data can also or instead be transmitted to the one or more remote management platforms 176, for instance, to carry out security, database, messaging, and/or other operations on grouped machines in the managed network 174. In embodiments, the machine-package association table 152 and/or other data can be stored to the one or more repositories 144 associated with the one or more package servers 162, and/or to other local or remote storage.

In 522, the one or more package servers 162 and/or other logic can generate and/or distribute the set of package updates 150 and/or other data or configuration commands to clients 102 of the managed network 174 based on the set of package subsets 178 and/or other bases or criteria. The one or more package servers 162, the one or more management platforms 176, and/or other logic or platforms can also or instead perform other management actions on the subject client or other machines organized or configured based on the set of package subsets 178 and/or other bases or criteria. In 524, the inventory engine 148 of the one or more package servers 162 and/or other logic can update the aggregate package population record 170, the machine-package association table 152, and/or other data related to the package complement of the managed network 174, as appropriate.

For example, update operations can be initiated based on a predetermined schedule, such as once or week or once a month to interrogate the managed network 174 and discover recently added or recently deleted clients 102 and/or other machines. For further example, update activity can be triggered by the detection of a new client 102 and/or other machine that has registered to the managed network 174, or can be initiated based on other events or criteria. In 526, processing can return to a prior processing point, jump to a further processing point, or end.

The foregoing description is illustrative, and variations in configuration and implementation may occur to persons skilled in the art. For example, while embodiments have been described in which a unitary package manager 110 operating on client 102 is configured to control package management and client identification activity, in embodiments, multiple local and/or remote applications or software can interact to control the downloading, installation, testing, and other management of software packages, and the generation of the inventory of the set of installed packages 154 and associated data.

For further example, while embodiments have been described in which a group of one or more package servers 162 and/or associated one or more package repositories 144 capture and generate the aggregate package population record 170, the package subset enumeration table 156, and other records related to the package population of the managed network 174, in embodiments multiple groups or sets of package servers and/or repositories can perform package aggregation, subset generation, management and other activity. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
receiving an inventory of a set of installed packages from a plurality of clients populating a managed network;
generating an aggregate package population record from the inventory of the set of installed packages received from the plurality of clients;
generating, by a processor, a first table comprising an identification of the managed network and the aggregated package population having the set of installed packages hosted by the plurality of clients associated with the identification;
generating a package subset, the package subset comprising selected packages of the set of installed packages from the aggregate package population record, wherein the package subset is distributed throughout the managed network;
generating, by the processor, a second table comprising each client among the plurality of clients, the set of installed packages associated with the each client among the plurality of clients, and an identifier identifying the package subset associated with the each client among the plurality of clients;
encoding, by the processor, a relationship between the each client among the plurality of clients and the package subset in view of the first and the second table;
comparing, by the processor, the package subset to the set of installed packages for the each client among the plurality of clients in view of the encoded relationship;
identifying, by the processor, a client among the plurality of clients having packages matching the package subset; and
managing, by the processor, a plurality of tasks associated with the package subset for the identified client.

2. The method of claim 1, wherein the inventory of the set of installed packages from the plurality of the clients is generated via a package manager hosted on the client.

3. The method of claim 1, wherein the inventory of the set of installed packages comprises an identification of the packages in the inventory of the set of installed packages.

4. The method of claim 3, wherein the inventory of the set of installed packages comprises a set of attributes for the packages in the inventory of the set of installed packages.

5. The method of claim 4, wherein the set of attributes comprises one of a package name identifier, a package version identifier, a package epoch identifier, a package timestamp identifier, a package size identifier, a file name identifier, a file version identifier, a checksum value, a package release identifier, a file timestamp identifier, or a file size identifier.

6. The method of claim 1, where the aggregate package population record is generated in a remote management platform.

7. The method of claim 6, wherein the remote management platform comprises one of a package management platform or a network management platform.

8. The method of claim 7, wherein the aggregate package population record is stored in a software repository associated with the package management platform.

9. The method of claim 1, wherein the generating the package subset in view of one of receiving a selection of the package subset via user input or receiving a selection of the package subset via an automatic selection.

10. The method of claim 1, further comprising generating a software package update for the plurality of clients in view of the identified package subset.

11. The method of claim 1, further comprising generating an update to the aggregate package population record in view of a detected change in the set of installed software packages for the plurality of clients.

12. A system comprising:
a processor;
a memory coupled to the processor to provide instructions to the processor, and in response to the instructions, the processor to:
receive an inventory of a set of installed packages from a plurality of clients populating a managed network;
generate an aggregate package population record from the inventory of the set of installed packages received from the plurality of clients;
generate a first table comprising an identification of the managed network and the aggregated package population having the set of installed packages hosted by the plurality of clients associated with the identification;
generate a package subset, the package subset comprising selected packages of the set of installed packages from the aggregate package population record, wherein the package subset is distributed throughout the managed network;
generate a second table comprising each client among the plurality of clients, the set of installed packages associated with the each client among the plurality of clients, and an identifier identifying the package subset associated with the each client among the plurality of clients;
encode a relationship between the each client among the plurality of clients and the package subset in view of the first and the second table;
compare the package subset to the set of installed packages for the each client among the plurality of clients in view of the encoded relationship;
identify a client among the plurality of clients having packages matching the package subset; and
manage a plurality of tasks associated with the package subset for the identified client.

13. The system of claim 12, wherein the inventory of the set of installed packages from the plurality of the clients is generated via a package manager hosted on the client.

14. The system of claim 12, wherein the inventory of the set of installed packages comprises an identification of the packages in the inventory of the set of installed packages.

15. The system of claim 14, wherein the inventory of the set of installed packages comprises a set of attributes for the package in the inventory of the set of installed packages.

16. The system of claim 15, wherein the set of attributes comprises one of a package name identifier, a package version identifier, a package epoch identifier, a package timestamp identifier, a package size identifier, a file name identifier, a file version identifier, a checksum value, a package release identifier, a file timestamp identifier, or a file size identifier.

17. The system of claim 12, where the aggregate package population record is generated in a remote management platform.

18. The system of claim 17, wherein the at least one remote management platform comprises one of a package management platform or a network management platform.

19. The system of claim 18, wherein the aggregate package population record is stored in a software repository associated with the package management platform.

20. The method of claim 1 further comprising generating an update to the aggregated package population record in view of a detected change in the plurality of clients.

* * * * *